(12) United States Patent
Foster et al.

(10) Patent No.: US 7,401,332 B2
(45) Date of Patent: Jul. 15, 2008

(54) SYSTEM AND APPARATUS FOR ELIMINATING USER INTERACTION DURING HARDWARE CONFIGURATION AT SYSTEM BOOT

(75) Inventors: Robert Kimberlin Foster, Austin, TX (US); Mark Wayne Grosch, Lakeway, TX (US); Minh Nguyen, Austin, TX (US); Christine Iju Wang, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/339,762

(22) Filed: Jan. 9, 2003

(65) Prior Publication Data

US 2004/0139308 A1    Jul. 15, 2004

(51) Int. Cl.
   *G06F 9/445* (2006.01)
   *G06F 3/00* (2006.01)
(52) U.S. Cl. .................... 717/175; 717/169; 710/10
(58) Field of Classification Search .......... 717/167–168
   See application file for complete search history.

(56) References Cited

U.S. PATENT DOCUMENTS 5,768,568 A    6/1998    Inui et al. ................. 710/16

(Continued)

FOREIGN PATENT DOCUMENTS

EP    0509945 A    10/1992

(Continued)

OTHER PUBLICATIONS

"Smartinstall for PCs:allow multiple pre-load images to be restored from a single Recovery CD", IBM Research Disclosure, vol. 412, No. 89, Aug. 1998, XP007123199, ISSN: 0374-4353.

*Primary Examiner*—Tuan Dam
*Assistant Examiner*—Chuck Kendall
(74) *Attorney, Agent, or Firm*—Stephen J. Walder, Jr.; Diana R. Gerhardt

(57) ABSTRACT

A system and method are provided to allow a user to update a computer system without having to interact with an initialization, or configurator software utility, or program. More particularly, the present invention allows a system provider, manufacturer, or service provider to create an installation file that, when provided to a user, will configure a system to accommodate newly added/removed hardware automatically. A base model and a new model of the system are maintained. The new model will include one or more different configurations, such as new graphics adapters, communications adapters, I/O controllers, or the like. The provider will have created a recovery/install image to be used with the base model. An operating system including a configurator program will be running on both the base model system and new model system. Software, such as device drivers, to be used with the new model's changed hardware configuration is installed on the new model system and initialized using its configurator program. A file for the new model is created using vital product data for the base model system. This new model configuration file is then installed on the base model machine and its configurator program is run. The configuration information (including the new model configuration data) is then stored as a system image and a script file is added to this system image. This new model image is then made available to end users, by a CD or the like, having a new model system. The script file in the new model image will specify a start priority that will allow it to be called before the configurator program and it will proceed to initialize the system with the appropriate software captured from the system provider's new model machine.

24 Claims, 7 Drawing Sheets

U.S. PATENT DOCUMENTS

| | | |
|---|---|---|
| 5,894,571 A | 4/1999 | O'Connor et al. ............... 713/2 |
| 6,038,399 A * | 3/2000 | Fisher et al. ................. 717/178 |
| 6,513,159 B1 | 1/2003 | Dodson ....................... 717/178 |
| 6,550,061 B1 * | 4/2003 | Bearden et al. ............. 717/174 |
| 6,636,961 B1 | 10/2003 | Braun et al. .................... 713/1 |
| 6,735,601 B1 * | 5/2004 | Subrahmanyam ........... 707/200 |
| 2002/0069353 A1 | 6/2002 | Smith |
| 2003/0023839 A1 * | 1/2003 | Burkhardt et al. ............... 713/1 |
| 2004/0133689 A1 * | 7/2004 | Vasisht ....................... 709/228 |

FOREIGN PATENT DOCUMENTS

| | | |
|---|---|---|
| EP | 0867806 A | 9/1998 |
| JP | 2001 043086 | 2/2001 |
| KR | PUPA 2000-63253 | 11/2000 |

* cited by examiner

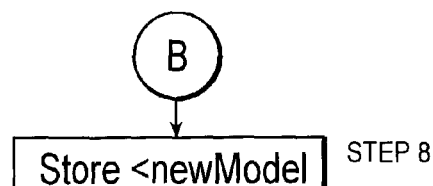
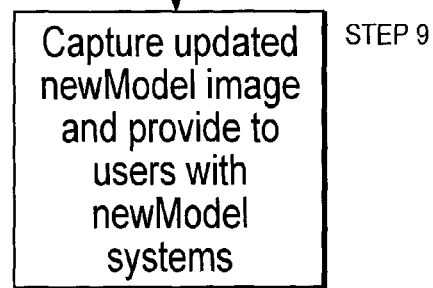
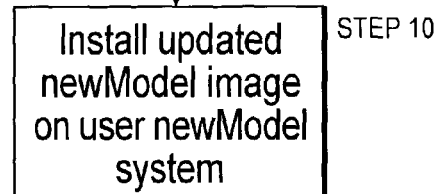
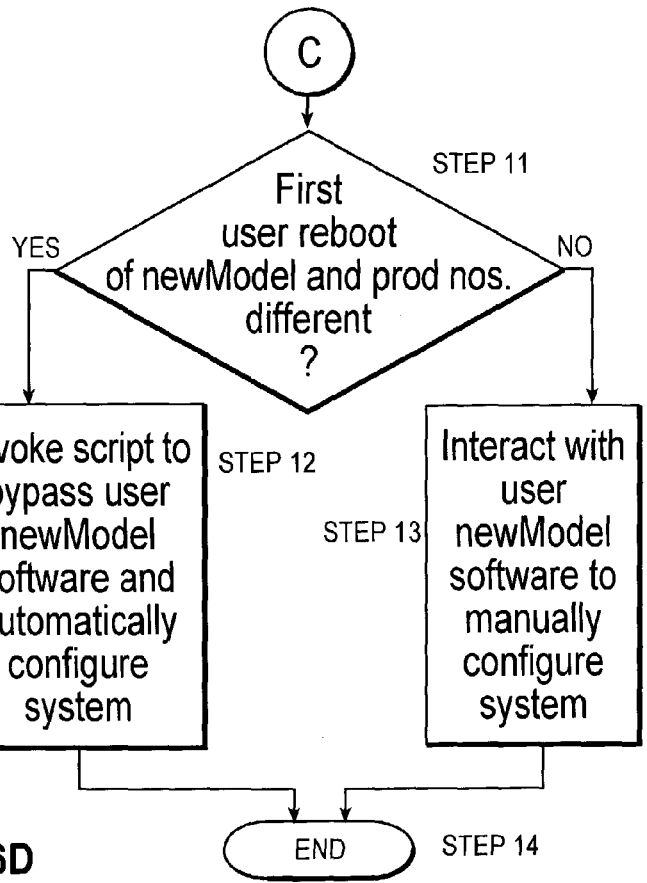
FIG. 6C
FIG. 6D

SYSTEM AND APPARATUS FOR ELIMINATING USER INTERACTION DURING HARDWARE CONFIGURATION AT SYSTEM BOOT

BACKGROUND OF THE INVENTION

1. Field of the Invention

The present invention relates to upgrading the hardware and software configuration of a closed system, such as a network appliance, system control console, or the like. More particularly, the present invention provides a technique for eliminating user interaction during system boot when the operating system (OS) detects the presence of new hardware components or the absence of previously recognized hardware components.

2. Description of Related Art

With the continual advance of computer technology, systems are becoming increasingly large and complex. For example, many server type computers are being coupled to form multi-node systems which may include hundreds, if not thousands of interconnected computer processors. These processors may be organized into many logical partitions which will be controlled by multiple hardware management consoles to control, monitor, or the like, the various functions of the multi-node systems. These computing systems demonstrate an extremely large resource and financial commitment by the purchasers. Due to their high cost, purchasers will not be able to upgrade their entire systems and management consoles as fast as the technology changes. However, peripheral devices and software will be periodically added to existing computer systems to enhance their capabilities in various areas, such as graphics and video processing, communications, networking, storage, and the like.

Additionally, there are other so-called "closed" computer systems that are also becoming more prevalent in today's computer driven world. A "closed" system is typically one having a fixed hardware and software configuration. For example, these systems may include personal digital assistants (PDAs), cellular phones, set top boxes, dedicated controllers, such as found in automobiles, and the like. Further, these types of systems include network appliances which are computer systems that are essentially dedicated to a specific type of networking application and not available to be updated. Other such "closed" systems include the hardware management consoles used to control various computer systems coupled together in a multiprocessing, or clustering environment. Hardware management consoles are also often used to manage various partitions in a data processing system. Partitioning refers to the allocation of hardware resources (processors, memory, I/O adapters, communications adapters, and the like) found in a single system to multiple operating system instances running on that system. Partitioning can be done physically through switches, routers, and the like or logically by use of address translation techniques with cause various instructions and data to be available to only a specified operating system instance. Similarly, a hardware management appliance is another type of "closed system" contemplated by the present invention. A hardware management appliance will be used to control and/or monitor the various functions present in a computer system, such as powering on and off the system being managed to ensure the components are initialized in the proper sequence, etc.

Data processing apparatus which are configured to operate with a specific type of hardware and software can be considered a closed system. Most, if not all, closed systems will include some type of input/output (I/O) device that will allow the software to be upgraded. For example, a PDA may have a synchronization port that provides connection to a desktop PC. Cellular phones can be accessed through a wireless connection and controllers typically include some type of communication port to access external data. Further, a hardware management console may include I/O devices, such as a CD ROM or diskette drive, as well as a communication port, or the like. Thus, systems are typically considered to be "closed" based on their specific software configuration, which does not provide for (or contemplate) the addition of hardware components and their corresponding device drivers.

However, like all types of computers, it is often desirable to upgrade "closed" systems with new hardware and software components. In this case a recovery/install image for each computer system model must be created. A recovery/install image is used by a manufacturer to preload software on a specific type of computer system. Also, the recovery/install image will be used by the user to reinstall the software should a major machine component fail, such as a hard drive, or the like. It is an expensive proposition to have separate recovery/install images for each machine model, and presents maintenance problems, since each different model of the same type of system will have a different basic set of software.

Further, while many operating systems include a non-interactive hardware detection capability, they require a user to login and run various commands in order to clean up the system software, such as when new hardware is added, or diagnostics need to be run. It can be seen that this type of solution is not practical for many computer appliances, including a hardware management console, since the are closed systems.

One example that illustrates the need for a system, such as the present invention, occurs when new hardware components are released and a system upgrade is desired. If the same image produced for the previous hardware is used for installation, the operating system (AIX, Linux) will detect the new (or removed) hardware, such as a video card, ethernet card, or the like. Typically an initialization program is invoked during system startup (boot). This initialization program will usually time out after a preset time, such as 30 seconds, if there is not user interaction with the graphical user interface (GUI). A GUI is normally a user friendly software application that allows the user to interact with the system by selecting from various displayed icons and/or typing intuitive word commands in defined fields, rather than requiring the actual system commands to be memorized and input at a command prompt, such as the C:\ prompt in DOS.

With conventional systems, the initialization program times out if the user does not interact with the system after 30 seconds. It can be understood that a significant problem will exist when the hardware being modified is the graphics or video adapter cards which control the display monitor. More particularly, when new display adapter cards are installed, the display monitor will not function until the system is initialized with new device drivers, but this cannot occur until the initialization program is run, which requires input from a user via a GUI displayed on the monitor. Further, this situation can also occur when the GUI from the initialization software is waiting for input from a newly installed device, such as a communications adapter, expanded memory, etc., but the device cannot respond without the appropriate software being installed which is dependent on user input to the initialization program.

Therefore, it can be seen that a need exists for a technique that supports upgrading a closed system without user interaction.

SUMMARY OF THE INVENTION

In contrast to the prior art, the present invention provides a mechanism that allows a user to update a computer system without having to interact with an initialization program, or configurator software utility, or the like.

Broadly, the present invention allows a manufacturer, or service provider to create an installation file that, when provided to a user, will configure a system to accommodate newly added/removed hardware automatically.

In one preferred embodiment, the system provider will maintain both a base model of the computer system and a new model of the system which includes one or more different configurations, such as new graphics adapters, communications adapters, I/O controllers, or the like. The provider will have created a recovery/install image to be used with the base model. An operating system including a configurator program will be running on both the base model system and new model system.

Next, new software such as device drivers to be used with the new model's added hardware is installed on the provider's new model system and initialized using the configurator program. A file for the new model is created using vital product data for the base model system. This new model configuration file is then installed on the base model machine and its configurator program is run. The configuration information (including the new model configuration data) is then stored and a script file is added to this configuration information. A script file is another term for macro or batch file, a script is a list of commands that can be executed without user interaction. A script language is a simple programming language which can be used by a programmer to write scripts.

In one of many possible scenarios, this image (configuration data for the new model system and script file) is then captured to a CD. Of course, any other type of computer readable media, or file transfer methodology is contemplated by the scope of the present invention.

This new model image is then made available to end users having the same configuration as the new model system used by the system provider. For example, if a particular graphics adapter upgrade is required, the new model system will be the same as the base model, except for the new graphics adapter. The provider will then be able to supply the new model image to the user along with the adapter and the user can physically install the adapter and configure it without the need to invoke the configurator utility in their operating system.

More particularly, the script file in the new model image will specify a start priority that will allow it to be called before the configurator program and it will proceed to initialize the user's new model system with the appropriate software captured from the system provider's new model machine.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
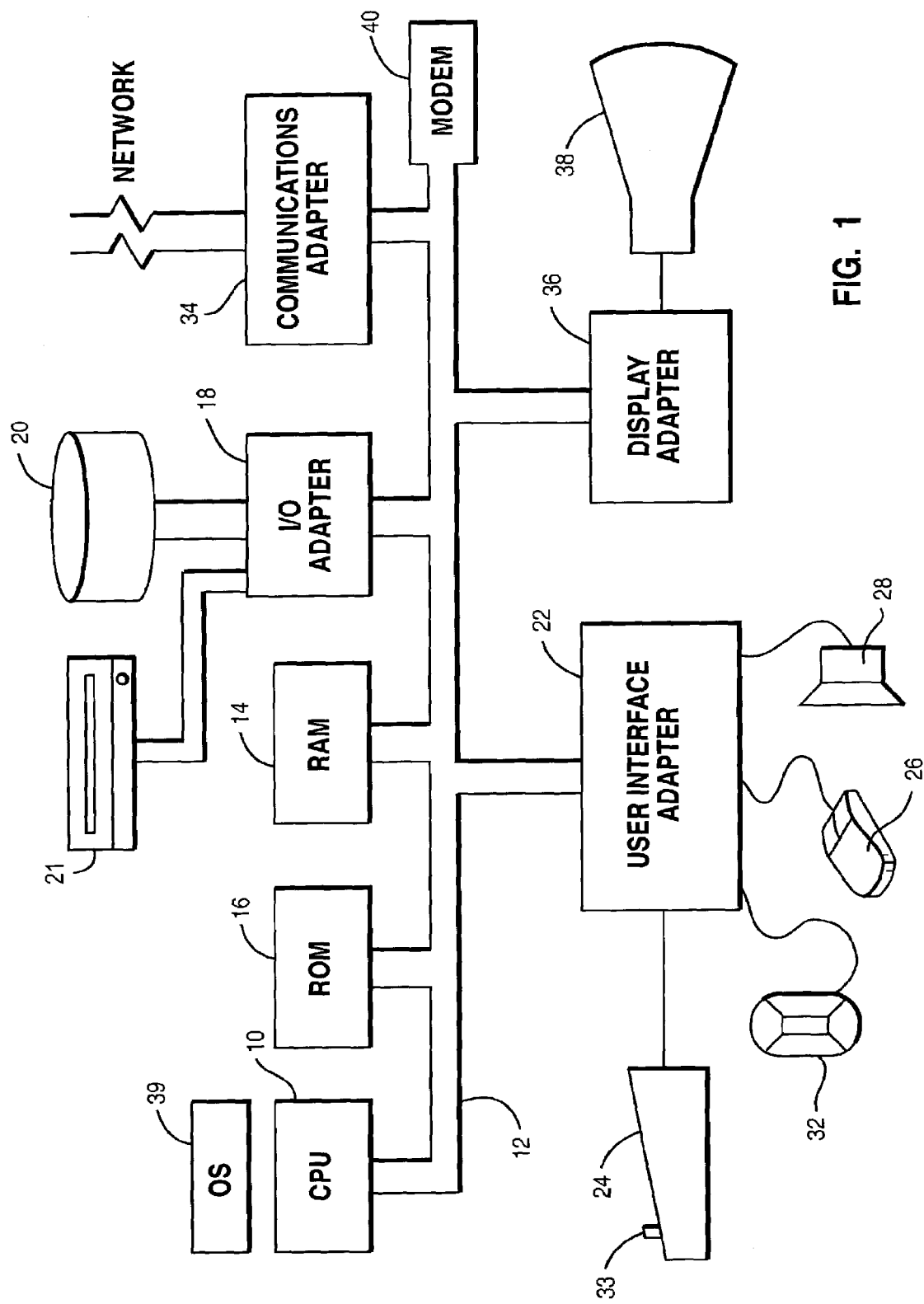
FIG. 1 is a block diagram of a client computer system that may be configured as a closed system and implement the boot technique of the present invention.

Computer appliances are typically closed systems having a fixed hardware and software configuration. An example of one such system is the IBM Hardware Management Console, used to manage the IBM p690 eServer data processing system. Typically, the hardware is a personal computer (PC) including a Pentium class microprocessor, or the like.

LINUX is a relatively new UNIX-like Operating system which is provided substantially free of charge, so long a certain criteria are met. This operating system is gaining in use and popularity among commercial computer system vendors. In one embodiment of the present invention the closed system being initialized is running the LINUX OS. One possible criteria associated with the distribution of the LINUX OS is that it if it is modified, then certain statements and assertions be made by the person, or entity that is modifying the program. It can be seen that modifying LINUX to configure newly installed hardware could cause a device driver, or the like, included in the LINUX OS to be modified. This could burden the user, running the configuration program to create statements relative to the modified code, in order to preserve their license rights. Thus, another possible advantage of the present invention is to remove the burden from the end user to modify header files and other proprietary statements in the LINUX OS. This will preserve the ability of LINUX users to maintain their copy of the OS under it standard licensing terms, with minimal impact.

In accordance with the present invention, all software (including LINUX) is installed on a first system. The software image (a snapshot of all software on the system) is then captured onto a Recovery/Install CD. This CD is used during manufacturing to preload the systems, and also by customers to restore their systems when data is lost from their hard disk. By using the conventional Recovery/Install CD, the need for a user to go through a complex re-installation procedure is eliminated and the user is further ensured that all necessary software is installed in a consistent manner. This conventional solution assumes that the same hardware will be attached to the system being initialized. That is, the assumption is made that the system being initialized is identical to the first, or base system. However, because there is always a need to move to new hardware as its performance improves, and cost decreases, this conventional method presents a problem. Specifically, when new hardware is released, if the same software image produced from the previous hardware (i.e. the base system) is used for installation, the Operating System (LINUX) will detect the new and/or removed hardware and interact with the user to configure the new hardware and/or remove the old hardware (ethernet, video cards, graphics adapters, etc.). In the case of LINUX, an initialization program called "Kudzu", is invoked during System initialization, and times out after 30 seconds if the user does not provide any input to the program, by typing on the keyboard, selecting items with the mouse, or the like. When this happens and if, for example, there is a new video adapter in the new system, the user will not be able to see the GUI (Graphical User Interface) displayed on the monitor. This type of situation will cause the initialization program to time out and it may not be possible to reconfigure the system to operate with the new hardware.

The present invention eliminates user interaction during system boot, when the Operating System detects new and/or removed hardware. The invention operates in such a way that there is no need by the user to modify the existing software utility program(s) included in the Operating System (LINUX in this example). This may be a further advantage for LINUX vendors because of certain constraints on the licensing of LINUX which are present due to its requirement as being a "free" operating system.

A preferred embodiment of the present invention and its advantages are better understood by referring to the figures, like numerals being used for like and corresponding parts of the accompanying figures.

Referring to FIG. 1, a typical data processing system is shown which may be used in conjunction with the present invention. A central processing unit (CPU) 10 may include a PowerPC microprocessor, commercially available from the IBM Corporation or an IA 32, IA 64 class microprocessor, available from Intel Corporation and others, interconnected to the various other system components by a system bus 12. Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20 and a read/write (R/W) CD 21. Communications adapter 34 may be a network card, such as a digital subscriber line (DSL) or ethernet card which interconnects bus 12 with an outside network, such as the Internet. A modem 40 may also be included which is connected to bus 12 to enable the data processing system to communicate with other such systems via the Internet, or other communications network (LAN, WAN) via a telephone line. User input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through keyboard 24, trackball 32 or mouse 26 and receiving output from the system via speaker 28 and display 38. Additionally, an operating system (OS) 39, such as the DOS, OS/2, Windows operating system, or the like is shown running on CPU 10 and used to coordinate the functions of the various components shown in FIG. 1.

Figure 2:
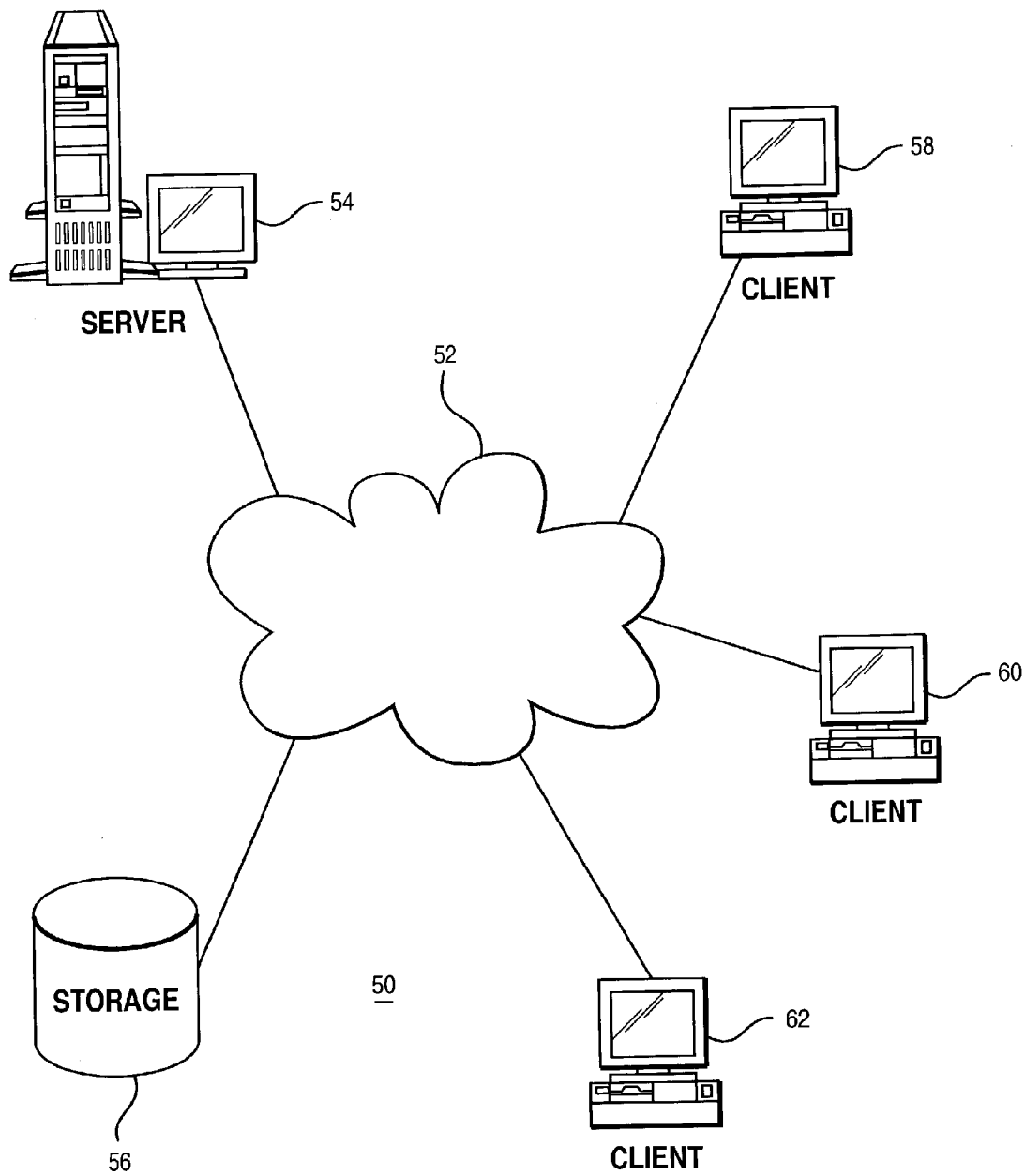
FIG. 2 is a pictorial representation which depicts a data processing system in which the present invention may be implemented in accordance with a preferred embodiment of the present invention.

Referring to FIG. 2 a pictorial representation of a network of data processing system is depicted in which a preferred embodiment of the present invention may be implemented. Network data processing system 50 is a network of computers in which the present invention may be implemented. Network data processing system 50 contains a network 52, which is the medium used to provide communications links between various devices and computers connected together within network data processing system 50. Network 52 may include connections, such as wire, wireless communication links, or fiber optic cables.

In the depicted example, a server 54 is connected to network 52 along with storage unit 56. In addition, clients 58, 60, and 62 also are connected to network 52. Network 52 may include permanent connections, such as wire or fiber optic cables, or temporary connections made through telephone connections. The communications network 52 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 54 without departing from the scope of the present invention. Moreover, as used herein, communications include those enabled by wired or wireless technology.

Clients 58, 60, and 62 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 54 provides data, such as boot files, operating system images, and applications to clients 58–62. Clients 58, 60, and 62 are clients to server 14. Network data processing system 50 may include additional servers, clients, and other devices not shown. In the depicted example, network data processing system 10 is the Internet with network 52 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 50 also may be implemented as a number of different types of networks, such as for example, an intranet, a local area network (LAN), or a wide area network (WAN). FIG. 2 is intended as an example, and not as an architectural limitation for the present invention.

Figure 3:
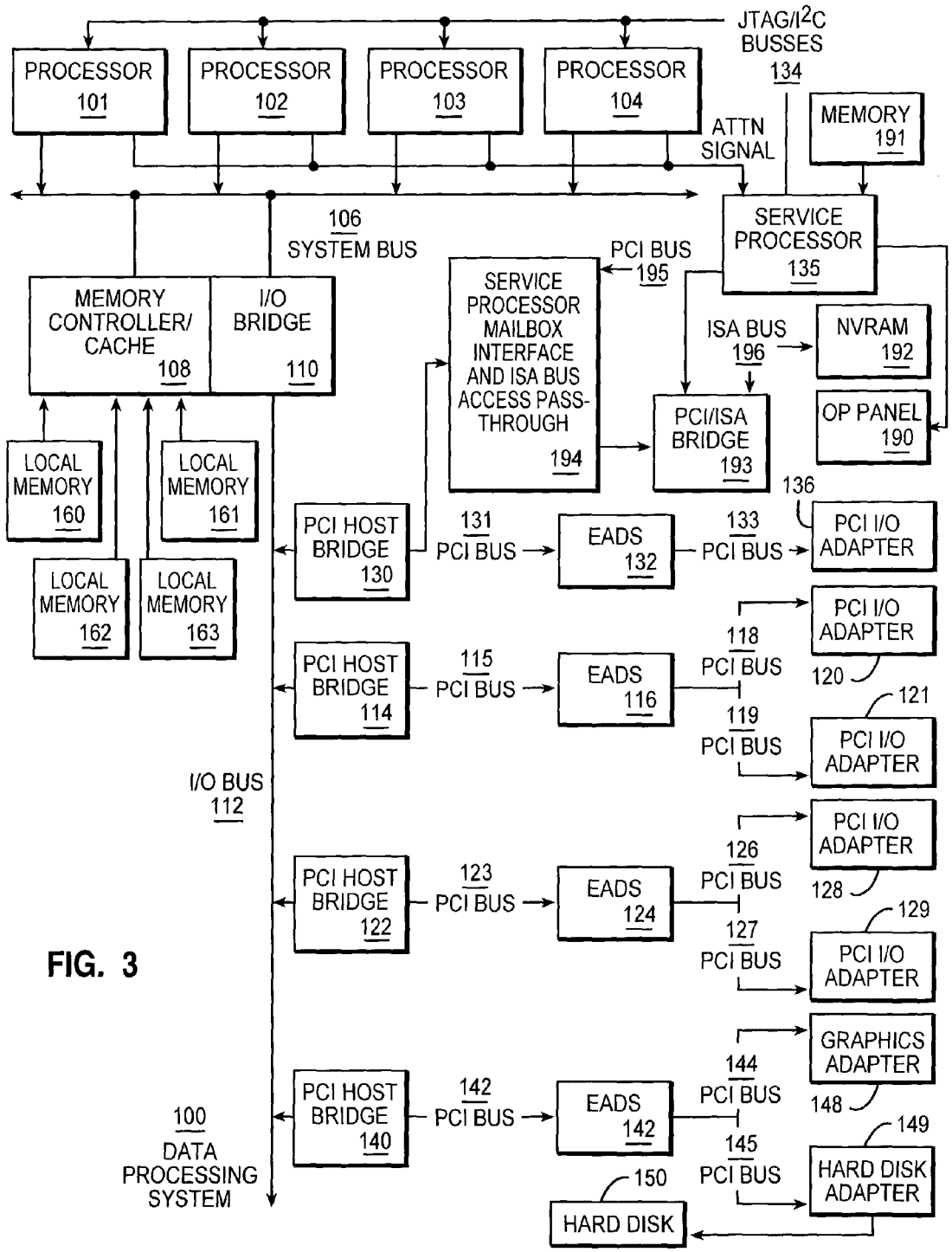
FIG. 3 is a more detailed block diagram of a data processing system in which the present invention may be implemented in accordance with the present invention.

FIG. 3 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM pSeries, eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system image executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 144 and 145 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
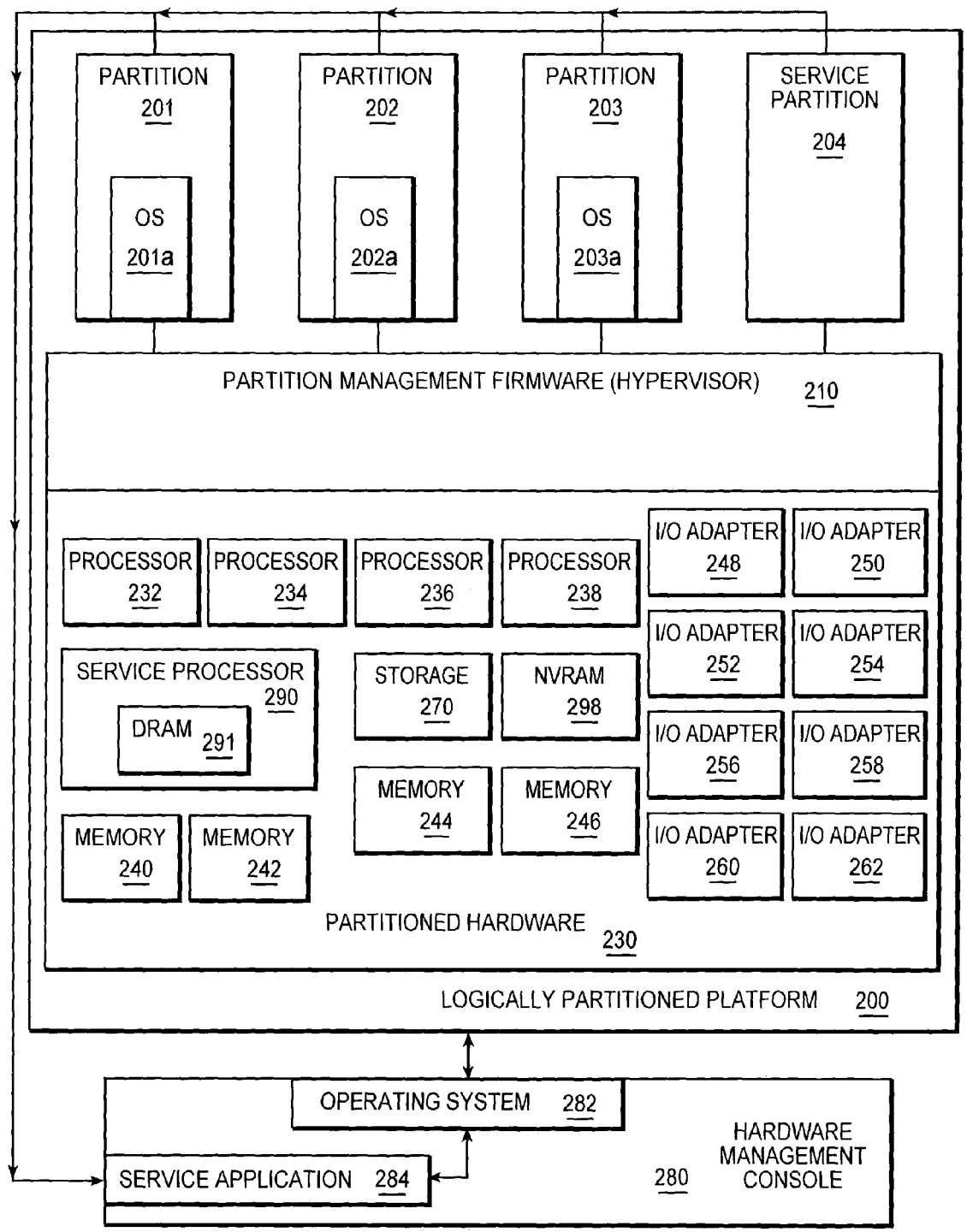
FIG. 4 is a block diagram of an exemplary logically partitioned platform in which the present invention may be implemented.

FIG. 4 is a block diagram of an exemplary logically partitioned platform in which the present invention may be implemented. Logically partitioned platform 200 includes partitioned hardware (also called the base hardware) 230, partition management firmware, also called a hypervisor 210, and partitions 201–204. Operating systems 201a–203a exist within partitions 201–203. Operating systems 201a–203a may be multiple copies of a single operating system or multiple heterogeneous operating systems simultaneously run on platform 200.

Logically partitioned platform 200 also includes a designated service partition 204. Service partition 204 may be used by a system administrator to set parameters, install firmware updates, and perform other service functions.

One or more of these partitions 201–203 may be used remotely by system administrators. Service partition 204 is not typically administered remotely.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–203 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–203a by virtualizing all the hardware resources of logically partitioned platform 200. Hypervisor 210 may attach I/O devices through I/O adapters 248–262 to single virtual machines in an exclusive mode for use by one of OS images 201a–203a.

A hardware management appliance, such a hardware management console (HMC) 280, in accordance with a preferred embodiment of the present invention, may be coupled to data processing system 100 which includes logically partitioned platform 200. HMC 280 is a separate computer system that is coupled to service processor 290 and may be used by a user to control various functions of data processing system 100 through service processor 290. HMC 280 includes a graphical user interface (GUI) which may be used by a user to select a partition to be rebooted.

HMC 280 includes an operating system image 282, such as AIX, LINUX, or the like, and a service application 284. Service application 284 receives error messages from the various partitions 201–204. Service application 284 also generates a heartbeat signal at regular intervals and outputs this heartbeat signal, via operating system 282 to service processor 290.

The initialization technique of the present invention will now be described in conjunction with a hardware management console, such as HMC 280. However, it should be understood the scope of the present invention applies with equal weight to any closed type system, such as a hardware management appliance, PDA, network appliance, embedded controller, or the like.

As one example of a preferred embodiment of the present invention two computer systems are considered. A first system will be referred to as baseModel and a modified system as the newModel. The baseModel is the computer system where the original Recovery/Install image is produced, and the newModel is the new hardware platform which includes, for example, a different hardware configuration with newly added/removed adapters, or the like. The newModel is the system where the software with the Recovery/Install image is to be installed.

As a first step all the software is installed on the newModel system, and the system provider then interacts with the newModel configurator program (Kudzu, in the case of Linux) to configure all the hardware on the newModel system. All of the configuration files are then captured. These files include an image of loaded device drivers, hardware configuration, X configuration, such as an X-Windows, Motif configuration (provides a GUI on Unix based systems), or the like presently installed on the system provider's newModel. The newModel image is stored in a file called <newModel product number>.tar, <currentModel product number>.tar, or the like, where the newModel product number is the product number stored in the newModel computer system BIOS.

Next, the <newModel product number>.tar file is installed on the baseModel system. The provider then interacts with the baseModel configurator program to configure all the hardware on the baseModel system. The tar file that was captured from the newModel system, along with the baseModel product number is then copied to a known location on the baseModel system. A script file is then provided that will be executed at system boot, prior to the configurator program. In one embodiment the newModel may be a modified hardware management console and the script file would be named hmcConfig, or the like. For a Linux operating system environment a script file can be created by using the utility chkconfig and add the script under /etc/rc.d/ directory. Inside the script file a start priority is specified that will allow the script to be called before the configurator program, Kudzu. When started on the newModel, the script will need to read the newModel machine's product name from its computer system's basic input/output system (BIOS) and use that information to decide whether or not to update the specific hardware configuration files. The image including the <newModel product number>.tar file and the script file are then captured on a CD. Those skilled in the art will appreciate that a CD is merely one of many suitable file transfer methodologies that can be used. For example, a tape, diskette, network connection, or the like are all contemplated by the scope of the present invention.

The captured image (.tar file and script) is then installed on the end user's newModel machine, by using the CD drive, or the like. When the system reboots for the first time, the script file will be invoked and determine the model number of the machine. If the newModel number is not the same as the baseModel (typically it will be different), then the script file will use the vital product date (VPD) of the newModel machine to look up the <newModel product number>.tar file. This .tar file will then install the hardware configuration files from the captured image. The configurator program on the end user's newModel machine is then invoked, however, there is no user interaction required since all of the necessary hardware configuration files that were previously restored will match the newModel system. The script file will only run one time. On a subsequent reboot, the script immediately exits and the user is then given the ability to interact with the configurator program. That is, while the present invention provides a method for allowing installation of an enhanced hardware configuration, it does not inhibit the user from interacting with the configurator program during a subsequent upgrade. Thus, it is still possible to add hardware to an already installed system and let the configurator program perform the detection. Further, when the baseModel becomes obsolete, all that needs to be done is to update the /opt/hsc/bin/baseModel.dat file with a new vital product name of the new baseModel.

Pseudocode and comments for the process described above are set forth below:

```
if [!-f <some directory>/executed_for_first_time]
    exit 0
# Read the VPD model from bios to find the product number
# of the current machine
baseModel=    cat /opt/hsc/bin/baseModel.dat
currentModel=    readVPD -productNumber
# If the model number of the machine is not the same as
# the base model, use the product number to look up
# a tar file, whose name is the product number, then
# restore the configuration files needed
if [ $currentModel != $baseModel]
    if [ -f <some directory>/$currentModel.tar ]
        tar -xf <some directory>/$currentModel.tar
rm -f <some directory>/executed_for_first_time
exit 0
```

Figure 5:
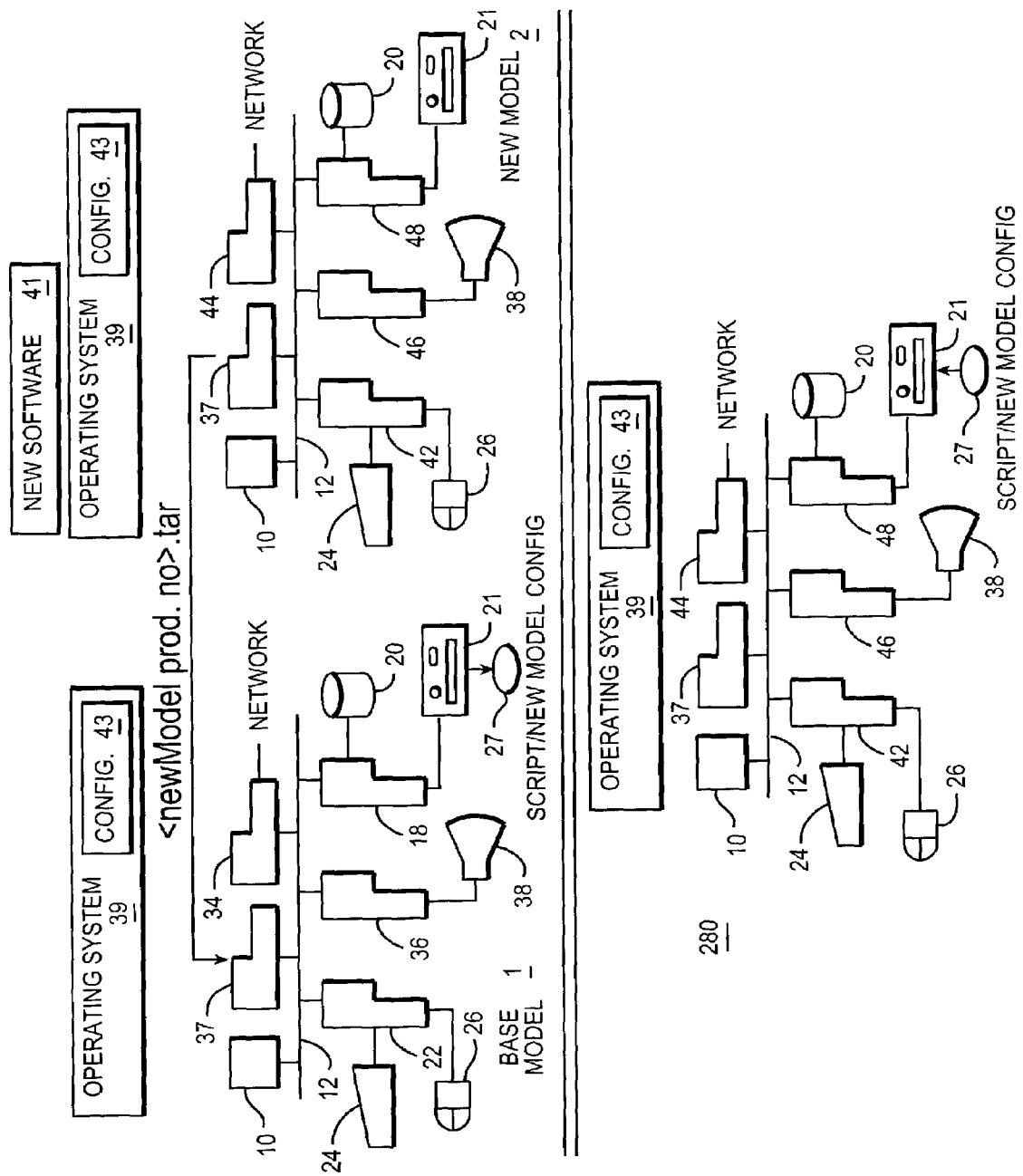
FIG. 5 is a block diagram depicting a closed system which may be configured without user interaction in accordance with a preferred embodiment of the present invention.

Referring to FIG. 5, the operation of a preferred embodiment of the present invention will now be described. Reference numeral 1 refers to a first, or base model data processing system and includes a processor 10, as previously described. Further, components similar to those shown in FIG. 1 are included as well. More particularly, bus 12 is used to interconnect network adapter 34, I/O adapter 18, display adapter 36 and user interface adapter 22. An additional I/O adapter 37, such as a serial port is also included and may be used to update the base model software in accordance with the present invention. It can be seen that base model 1 also includes various peripheral devices that are couple to bus 12 through the aforementioned adapters. For example, keyboard 24 and mouse 26 are coupled to user interface adapter 22. Display monitor 38 operates in conjunction with display adapter 36. I/O adapter 18 is used to interconnect disk storage 20 and a read/write CD drive 21 to bus 12. Therefore, it can be seen that bus 12 is used to transfer data between the various peripheral devices and processor 10. An operating system 39, such as LINUX is shown running on processor 10. This operating system will include a configurator program 43, such as Kudzu in the case of LINUX, that will be used to initialize the system.

As noted above, it is often desirable to add new components to a certain data processing base model to enhance its functionality. This may occur by the addition of various new adapter cards, or the like. Reference numeral 2 shows a new model, which is an upgraded base model that contains, e.g. new hardware and/or software. Of course, the present invention contemplates any change in system configuration, including the absence of previously installed hardware or an enhanced version of existing hardware.

In this example, the adapters included in the new model system 2 are substantially upgraded when compared to the adapters in base model 1. That is, a new or enhanced display adapter 46, user interface adapter 42, I/O adapter 48 and network adapter 44 are all provided in new model 2. It can be seen that the remaining components and software in new model 2 are the same as those included in base model 1 and are identified by like reference numerals. Further, new software 41 is provided that will include device drivers and an other initialization type program that will be used in conjunction with the new hardware. As shown in FIG. 5, new model data processing system 2 will be utilized by a manufacturer, or other system provider to configure the user independent initialization process of the present invention.

Additionally, FIG. 5 shows a system substantially identical to new model 2 which is identified as HMC 280. However, it should be understood that HMC 280 is but one type of closed system contemplated by the present invention. The previously mentioned hardware management appliances, PDAs, set top boxes, embedded controllers and the like are also considered within the scope of the present invention. Those skilled in the art will understand that HMC 280 is actually base model 1, but with the new components shown in new model 2. In a likely scenario, a user would purchase a base model 1 system and, after using that system for some period of time, upgrade that system with the display adapter 46, user interface adapter 42, I/O adapter 48 and/or network adapter 44. In this manner, the user will then effectively have a new model 2 system.

Figure 6A:
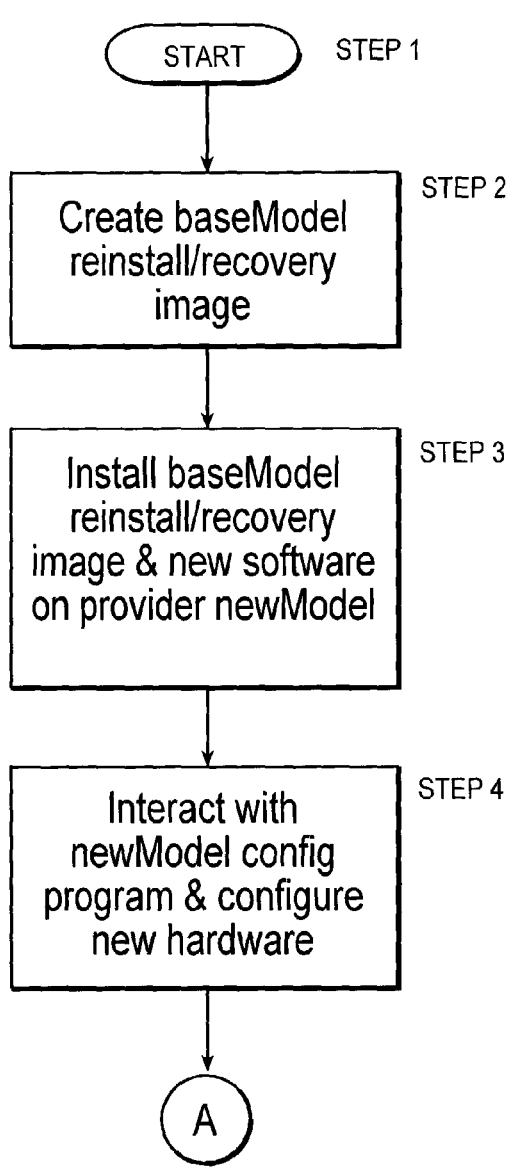
FIG. 6 is a flow chart showing the process steps utilized by the present invention to facilitate initialization of a closed system without user interaction.
Figure 6B:
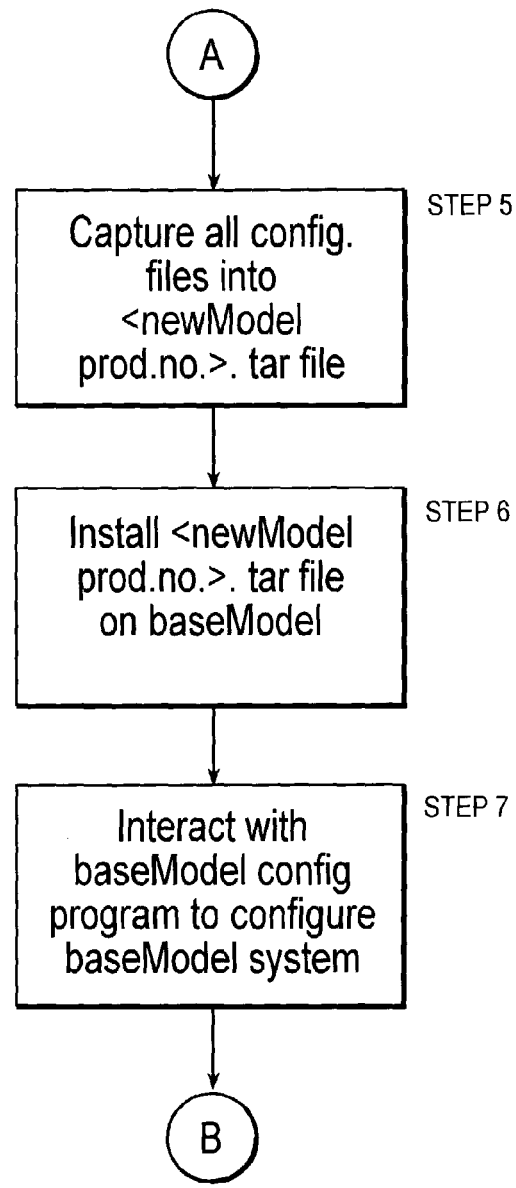

The operation of the present invention to allow initialization of HMC 280 without user interaction will now be described with reference to FIG. 6 in addition to FIG. 5.

At step 1 the user independent initialization process is started and the base model 1 reinstall/recovery image is created on stored on a Compact Disk, or the like, at step 2. Next, the created reinstall/recovery image and new software 41 are installed on new model 2 of the data processing system provided as shown in FIG. 5 (step 3). Specifically, the new software and hardware components are installed on new model 2. At step 4, the system provider then interacts with the new model 2 configurator program 43 (Kudzu, in the case of Linux) to configure all the hardware on the new model system 2. The configuration files are then captured. These files include an image of loaded device drivers, hardware configuration, X configuration, such as an X-Windows, Motif configuration (provides a GUI on Unix based systems), or the like presently installed on the system provider's newModel. Step 5, then stores the newModel image as a file, <newModel product number>.tar, where the newModel product number is the product number stored in the newModel computer system BIOS.

The configuration files of new model 2 which were captured in the newly created <newModel product number>.tar file (step 5), are then installed on base model 1 at step 6. It can be seen from FIG. 5 that a file transfer between I/O adapters 37 on both base model 1 and new model 2 is shown as one mechanism for transferring <newModel product number>.tar file from new model 2 to base model 1 and installing it thereon. It will be understood that many other file transfer techniques are contemplated by the present invention which could be used to install this file on base model 1, including writing the file to a tape, CD, or other storage media and then installing the file from the media to the system. Once the <newModel product number>.tar file is installed on base model system 1, a data processing system provider then interacts with the base model 1 configurator program 43 to configure all of the hardware on the base model system 1 (step 7). After configuration, the tar file that was captured from new model system 2 is then copied to a known location on base model 1 (step 8). Further, a script file is provided that will be executed at the next system boot and exclude the configurator program 43 from running during that next sequential boot operation. In one embodiment the new model 2 may be a modified hardware management console and the script file would be named hmcConfig, or the like. As noted above, in the Linux operating system environment a script file can be created by using the utility chkconfig and add the script under /etc/rc.d/ directory. Inside the script file a start priority is specified that will allow the script to be called before the configurator program 43, Kudzu.

At step 9, the updated, or modified, base model 1 image, including the script file and other configuration files is then captured on a CD 27, or the like. This CD having the updated new model 1 image can then be provided to users, purchasers, etc. of new model 2 systems to provide automatic system configuration.

At step 10 the modified base model image is installed on new model 2. The provided script file will then read the machine product name from the BIOS of new model 2 and use that information to decide whether or not to update the specific hardware configuration files. Specifically, step 11 determines if the new model system 2 is being rebooted for the first time, since being updated. That is, when the new model 2 reboots for the first time, the script file from the CD 27 will be invoked and determine the model number of the machine. Further, if the new model 2 number is not the same as the base model 1 (typically it will be different), then the script file will use the vital product date (VPD) of the new model 2 machine to look up the <newModel product number>.tar file. At step 12, the script file will then be invoked to bypass the user software for new model 2 and initiate the configuration without user interaction. No user interaction required since all of the necessary hardware configuration files that were previously restored will match the new model 2 system. However, if at step 11, new model 2 is being rebooted after the first initialization following installation of new components, or the newModel product number matches the baseModel product number, then the process continues to step 13 where the new model 2 user will interact with the configurator program to manually configure the system. That is, step 11 requires two events to occur in order for the automatic configuration to occur, i.e. It must be the first system reboot after updating the system and the product number of stored in the VPD of the new model 2 must be different from the base model number stored in the tar file. Otherwise, manual configuration by a user will occur (step 13). Subsequent to both steps 12 and 13, the process of the present invention ends at step 14, with the new model system 2 being configured with the newly added components.

Although certain preferred embodiments have been shown and described, it should be understood that many changes and modifications may be made therein without departing from the scope of the appended claims.

The invention claimed is:

1. A method for automatically configuring a data processing system, comprising the steps of:
   creating a recovery file for a base data processing system;
   installing said recovery file on a modified data processing system having at least one different device than said base data processing system;
   generating a configuration file using software included on said modified data processing system;
   installing said configuration file on said base data processing system and adding commands to automatically invoke said configuration file;
   installing said configuration file on a second said modified data processing system such that said at least one different device is configured by automatically invoking said configuration file.

2. A method according to claim 1 wherein said configuration file is invoked on said second modified data processing system without user interaction therewith.

3. A method according to claim 1 wherein said step of installing said configuration file on a second said modifiled data processing system comprises the step of configuring said second modified data processing without user modification of operating system software installed thereon.

4. A method according to claim 3 wherein said configuration file stores base product information for said base data processing system.

5. A method according to claim 4 wherein said step of installing said configuration file on said second modified data processing system comprises the steps of:
   reading a second product information associated with said second modified data processing system;
   comparing said base product information with said second product information; and
   automatically invoking said configuration file when said base product information and said second product information do not match.

6. A method according to claim 5 wherein the step of automatically invoking further comprises the step of automatically invoking said configuration file when said second modified data processing system is being initialized for the first time after said at least one different device has been installed.

7. A method according to claim 5 further comprising the step of enabling user interaction with said second modified data processing system when said base product information matches said second product information.

8. A method according to claim 7 further comprising the step of enabling user interaction with said second modified data processing system when said second modified data processing system is being initialized subsequent to the first time after said at least one different device has been installed.

9. A system for automatically configuring a data processing system, comprising:
   means for creating a recovery file for a base data processing system;
   means for installing said recovery file on a modified data processing system having at least one different device than said base data processing system;
   means for generating a configuration file using software included on said modified data processing system;
   means for installing said configuration file on said base data processing system and adding commands to automatically invoke said configuration file;
   means for installing said configuration file on a second said modified data processing system such that said at least one different device is configured by automatically invoking said configuration file.

10. A system according to claim 9 wherein said configuration file is invoked on said second modified data processing system without user interaction therewith.

11. A system according to claim 9 wherein said means for installing said configuration file on a second said modified data processing system comprises means for configuring said second modified data processing without user modification of operating system software installed thereon.

12. A system according to claim 11 wherein said configuration file stores base product information for said base data processing system.

13. A system according to claim 12 wherein said means for installing said configuration file on said second modified data processing system comprises:
   means for reading a second product information associated with said second modified data processing system;
   means for comparing said base product information with said second product information; and
   means for automatically invoking said configuration file when said base product information and said second product information do not match.

14. A system according to claim 13 wherein the means for automatically invoking further comprises means for automatically invoking said configuration file when said second modified data processing system is being initialized for the first time after said at least one different dcvicc has been installed.

15. A system according to claim 13 further comprising means for enabling user interaction with said second modified data processing system when said base product information matches said second product information.

16. A system according to claim 15 further comprising means for enabling user interaction with said second modified data processing system when said second modified data processing system is being initialized subsequent to the first time after said at least one different device has been installed.

17. A computer progam product, stored on a computer readable media, including program instructions for automatically configuring a data processing system, comprising:
   program instructions for creating a recovery file for a base data processing system;
   program instructions for installing said recovery file on a modified data processing system having at least one different device than said base data processing system;
   program instructions for generating a configuration file using software included on said modified data processing system;
   program instructions for installing said configuration file on said base data processing system and adding commands to automatically invoke said configuration file;

program instructions for installing said configuration file on a second said modified data processing system such that said at least one different device is configured by automatically invoking said configuration file.

18. A computer program product according to claim 17 wherein said configuration file is invoked on said second modified data processing system without user interaction therewith.

19. A computer program product according to claim 17 wherein said program instructions for installing said configuration file on a second said modified data processing system comprises program instructions for configuring said second modified data processing without user modification of operating system software installed thereon.

20. A computer program product according to claim 19 wherein said configuration file stores base product information for said base data processing system.

21. A computer program product according to claim 20 wherein said program instruction for installing said configuration file on said second modified data processing system comprises:

program instructions for reading a second product information associated with said second modified data processing system;

program instructions for comparing said base product information with said second product information; and program instructions for automatically invoking said configuration file when said base product information and said second product information do not match.

22. A computer program product according to claim 21 wherein the program instructions for automatically invoking further comprises program instructions for automatically invoking said configuration file when said second modified data processing system is being initialized for the first time after said at least one different device has been installed.

23. A computer program product according to claim 21 further comprising program instructions for enabling user interaction with said second modified data processing system when said base product information matches said second product information.

24. A computer program product according to claim 23 further comprising program instructions for enabling user interaction with said second modified data processing system when said second modified data processing system is being initialized subsequent to the first time after said at least one different device has been installed.

* * * * *